United States Patent [19]
Hunter et al.

[11] Patent Number: 6,081,501
[45] Date of Patent: Jun. 27, 2000

[54] ATTACHMENT SYSTEM FOR WRITE-PROTECT RING FOR OPTICAL DISK

[75] Inventors: Charles L. Hunter; Lawrence N. Taugher, both of Loveland, Colo.

[73] Assignee: Hewlett-Packard Company, Palo Alto, Calif.

[21] Appl. No.: 08/932,849

[22] Filed: Sep. 18, 1997

[51] Int. Cl.$^7$ .................................................. G11B 3/70
[52] U.S. Cl. ........................................................ 369/290
[58] Field of Search ..................... 40/340; 101/4, 101/485; 283/81, 100, 101, 104; 369/275.2, 275.5, 280, 291, 292, 47

[56] References Cited

U.S. PATENT DOCUMENTS

| | | | |
|---|---|---|---|
| 4,032,679 | 6/1977 | Aoyagi | 428/42 |
| 4,385,460 | 5/1983 | Hanna | 40/340 |
| 4,879,710 | 11/1989 | Iijima | 369/291 |
| 4,903,255 | 2/1990 | Sugaya et al. | 369/284 |
| 4,973,088 | 11/1990 | Levy | 283/81 |
| 4,983,437 | 1/1991 | Merrick | 428/40 |
| 5,012,380 | 4/1991 | Harissis et al. | 360/135 |
| 5,020,048 | 5/1991 | Arai et al. | 369/291 |
| 5,375,515 | 12/1994 | Morgan | 101/4 |
| 5,435,246 | 7/1995 | Edman | 101/333 |
| 5,505,299 | 4/1996 | Ditzig et al. | 206/308.1 |
| 5,543,001 | 8/1996 | Casillo et al. | 156/60 |
| 5,646,920 | 7/1997 | Raczynski | 369/47 |
| 5,732,979 | 3/1998 | Finke et al. | 283/81 |
| 5,757,765 | 5/1998 | Chen | 369/291 |
| 5,770,289 | 6/1998 | Tracy | 428/40.1 |
| 5,799,982 | 9/1998 | McClure et al. | 283/31 |

FOREIGN PATENT DOCUMENTS

| | | |
|---|---|---|
| 0 559 273 A2 | 9/1993 | European Pat. Off. . |
| 0 909 74 73 | 4/1997 | European Pat. Off. . |
| 0855713 A1 | 7/1998 | European Pat. Off. . |
| DE 29608885 U1 | 9/1996 | Germany . |
| DE 29701108 U1 | 3/1997 | Germany . |
| WO 97/26564 | 7/1997 | WIPO . |
| WO 97/44787 | 11/1997 | WIPO . |
| WO 99/10888 | 3/1999 | WIPO . |

*Primary Examiner*—David L. Ometz
*Assistant Examiner*—Angel Castro
*Attorney, Agent, or Firm*—Augustus W. Winfield

[57] ABSTRACT

A system for attaching an adhesive backed write-protect ring to an optical disk with the center of the ring aligned to the center of the central hole in the disk. A write-protect assembly is formed from a multilayer material having an adhesive backed label layer and a backing layer. The write-protect assembly includes a removable innermost area that, when removed, forms a hole having a diameter that is the same diameter as the central hole of an optical disk. The innermost area is at least partially surrounded by a ring shaped alignment area that is also removable. Finally, the alignment area is surrounded by the write-protect ring. The central area of the assembly is punched out to form a hole and the backing material is removed from at least part of the write protect area, exposing the adhesive coated surface. The assembly and an optical disk are placed onto an alignment cylinder. The alignment area of the write-protect assembly ensures that the center of the write-protect ring is aligned to the center of the hole in the disk. Finally, the disk with write-protect ring and alignment area attached is removed from the alignment cylinder and the alignment area of the write-protect assembly is removed, leaving just the write-protect ring attached to the disk. The hub of the plastic insert tray of a CD jewel case may be used for an alignment cylinder. In an alternative embodiment of the invention, the write-protect assembly is placed onto the hub first, and the design of the assembly is such that the hub helps remove the central area and the hub helps removal of the backing over the write-protect ring.

20 Claims, 7 Drawing Sheets

ATTACHMENT SYSTEM FOR WRITE-PROTECT RING FOR OPTICAL DISK

FIELD OF INVENTION

This invention relates generally to optical disk media and more specifically to attachment of adhesive backed rings used for write protection on rewritable compact disk media and similar optical disk media.

BACKGROUND OF THE INVENTION

Rewritable mass memory media is typically contained in a rigid protective cartridge during operation and the cartridge typically includes a write-protect feature to protect information on a storage medium from being destroyed. For example, many data tape cartridges have a moveable plastic tab on the cartridge that can be moved to one of two positions. Similarly, flexible diskettes in hard plastic cases have a sliding or breakaway plastic tab on the plastic case. Rewritable compact disks (CD-RW) and rewritable Digital Versatile Disks (DVD, also called Digital Video Disks), however, are not in a cartridge during operation. Compact discs are commonly stored in clear plastic containers commonly called "jewel" cases or jewel boxes, but the disks are removed from these boxes during operation. Therefore, write protection for CD's and DVD's must be implemented directly on the disk medium. Solutions have been proposed that are software based. That is, if a particular bit or data field has a particular value, software (operating system or drive controller) is not supposed to overwrite data on the medium. However, software solutions require support by all operating systems, software drivers and drives. If a disk is created by one operating system or drive controller that supports a software write-protect feature, and then is taken to a system that does not support the feature, data may be inadvertently destroyed. In addition, a software virus could bypass software write protection to delete data on the disk. There is a need for a physical write-protect feature, directly on the disk medium, that protects against writing for any software or any drive.

Industry standard CD-RW media use a phase change material having a transparency that can be reversibly changed by heating, and then cooling at a controlled rate. In CD-RW drives, a laser is used to heat, and then cool small areas at a controlled rate. Laser power must be calibrated for each disk medium. Before writing or erasing, a standard CD-RW drive must successfully calibrate laser power by writing into a Power Calibration Area on the medium. If the drive cannot read the calibration patterns in the Power Calibration Area, it will not erase or write in the data area of the disk. U.S. application Ser. No. 08/823,823 discloses a write-protect device in which the Power Calibration Area is covered by a removable opaque adhesive backed ring. Optical disks of interest have a central hole. Drives grip the optical disk around the central hole using mechanisms that may be sensitive to the thickness of the optical disk. Therefore, the write protect ring preferably does not intrude in the area of the disk immediately surrounding the central hole in the disk. The permissible mechanical tolerance for positioning a write-protect ring is relatively small. However, if a write-protect ring cannot intrude into the area adjacent to the central hole in the disk, the central hole in the disk cannot be used to directly align a write-protect ring. There is a need for a low cost, easy-to-use system for precise positioning of adhesive backed write-protect rings onto optical disks.

SUMMARY OF THE INVENTION

A write-protect assembly is formed from a multilayer material. The material comprises an adhesive backed label layer and a backing layer. The write-protect assembly includes a removable innermost area that, when removed, forms a hole having a diameter that is the same diameter as the central hole of an optical disk. The innermost area is at least partially surrounded by a ring shaped alignment area that is also removable. Finally, the alignment area is surrounded by the write-protect ring.

In operation, for a first example embodiment of the invention, the central area of the assembly is punched out to form a hole and the backing material is removed from at least a portion of the write protect area, exposing the adhesive coated surface. An optical disk is placed onto an alignment cylinder having a diameter the same as the central hole of the optical disk. The disk is placed onto the alignment cylinder with the data side up. The write-protect assembly is placed onto the alignment cylinder with the adhesive facing the disk. The alignment area of the write-protect assembly ensures that the center of the write-protect ring is aligned to the center of the hole in the disk. Finally, the disk with write-protect ring and alignment area attached is removed from the alignment cylinder and the alignment area of the write-protect assembly is removed, leaving just the write-protect ring attached to the disk.

The first example embodiment requires an alignment cylinder. A readily available alignment cylinder may be found in the CD jewel cases commonly used to store CD's. Many CD jewel cases include a plastic insert tray that has a hub for gripping the disk within a hole in the center of the disk. The hub of the plastic insert tray of a CD jewel case may be used for an alignment cylinder as discussed in the first embodiment. The disk may be placed on the hub, and then the write-protect assembly may be placed onto the hub and onto the disk.

In the first embodiment, the backing on the write-protect ring must be removed before the write-protect assembly is placed onto the hub. In a second example embodiment of the invention, the write-protect assembly is placed onto the hub first, and the design of the assembly is such that the hub helps remove the central area and the hub helps removal of the backing over the write-protect ring. This is easier than having to selectively lift an area of the backing before placing the assembly onto the hub. In the second example embodiment, the plastic insert tray is modified to provide a raised ring-shaped platform around the hub. The write-protect assembly is pressed onto the hub. Backing material is then peeled away from the write-protect ring leaving a ring of exposed adhesive. The disk is then pressed onto the hub with the data side of the disk oriented toward the exposed adhesive. The disk is pressed against the adhesive and the raised ring-shaped platform. The raised platform on the jewel case insert tray provides a pressure surface for pressing the write-protect ring adhesive against the disk.

Multiple write-protect rings may be provided as tear-away features in an insert for the cover of the jewel case. Write-protect rings may be removable. Alternatively, if desired, permanent write-protect rings may be implemented by using a material with an adhesive that is extremely difficult to remove without damaging the disk.

DETAILED DESCRIPTION OF THE PREFERRED EMBODIMENT OF THE INVENTION

Figure 1:
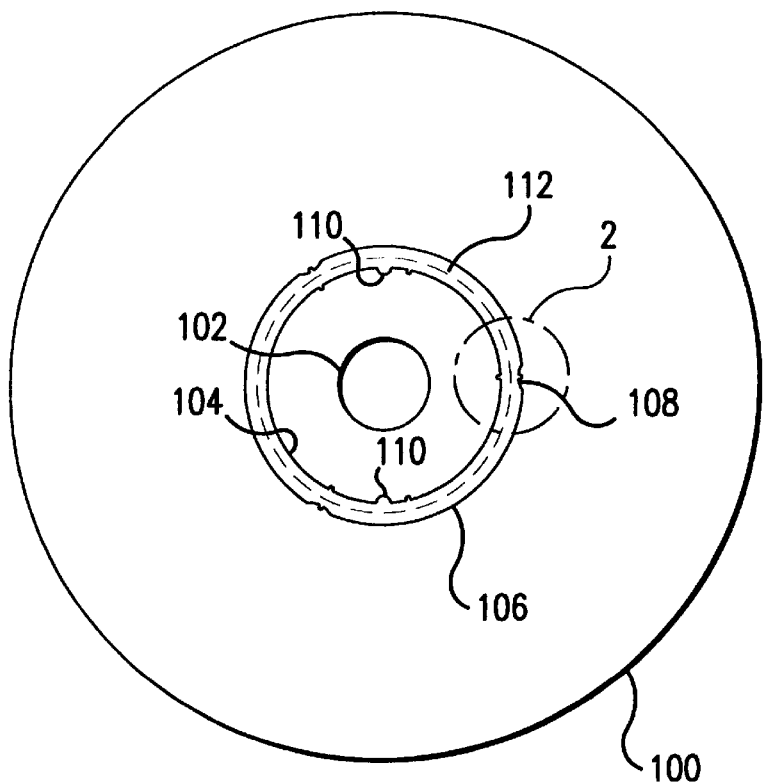
FIG. 1 is a plane view of the data side of a rewritable optical disk with an attached write-protect ring in accordance with the invention.

FIG. 1 illustrates the end goal of the invention. FIG. 1 illustrates the data surface of an optical disk 100. The optical disk includes a center hole 102. An adhesive backed opaque write-protect ring 104 is attached so that the center of the ring 104 is aligned with the center of hole 102. Tabs 110 are areas with the adhesive covered by a backing material to facilitate removal of the write-protect ring 104 from the disk. The following example embodiments illustrate how the write-protect ring 104 is attached with accurate alignment.

Standard rewritable disks are 120 mm in diameter, with a 15 mm diameter hole. A circle having a diameter of 50 mm defines the beginning of the data area. Data is written along a single spiral track, starting at the inner edge of the data area and spiraling outward toward the edge of the disk. In rewritable media, a Power Calibration Area, having an inner diameter of 44.7 mm and an outer diameter of 45.5 mm, is used for laser power calibration. The drive laser system writes, and then reads, various test patterns in the Power Calibration Area to calibrate the peak power and rate of decrease of power. Laser writing power must be calibrated for each disk. In addition, there is a Program Memory Area, having an inner diameter of 45.5 mm and an outer diameter of 45.7 mm. The Program Memory Area is used for a table of contents used only during writing.

In FIG. 1, the outer radius of the write-protection ring 104 must extend to the outer radius of the Power Calibration Area (small gaps may be exposed by indentations 108 discussed further below) to prevent laser power calibration and the outer radius may cover part or all of the Program Memory Area. However, the outer radius of the write-protect ring must not cover any of the data area. That is, for the CD-RW disk format dimensions discussed above, the write-protect ring 104 has a maximum inner diameter of 44.7 mm, a minimum outer diameter greater than 45.5 mm and a maximum outer diameter less than 50 mm (preferably less than 46 mm). Note that the laser (not illustrated) operates at a particular wavelength, so that "opaque" means that the write-protect ring 104 is sufficiently non-transparent at the wavelength of the laser to prevent a successful laser power calibration. The ring 104 may be made removable. Alternatively, a material and adhesive may be used that makes the ring extremely difficult to remove without damaging the disk.

Figure 2:
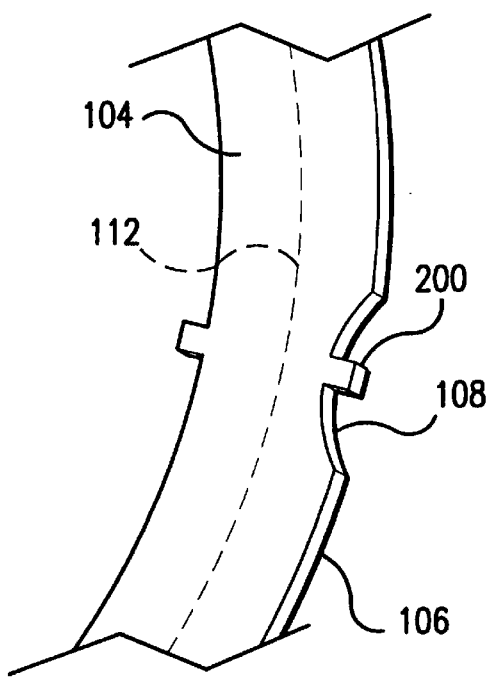
FIG. 2 is an expanded view of a detail of the write-protect ring of FIG. 1.

In each of the example embodiments of the invention, ring 104 is formed from a larger sheet of multilayer material, which may include multiple other rings. The material comprises an adhesive backed label layer and a backing layer. Each layer is cut through to provide the ring 104 except for several small uncut areas so that the ring and other sections may be manually punched out of the sheet. In FIG. 1, the outer edge 106 of ring 104 needs to extend beyond the Power Calibration Area (not illustrated) of the disk 100, and may extend over the Program Memory Area but must not extend into the data storage area. Therefore, the outer edge 106 of the ring 104 must be very clean. However, uncut areas to hold the label within the larger material area inherently may leave small projections after punching. Therefore, in FIG. 1, small indentations 108 are cut into the outer edge 106 of the ring and the small uncut portions are placed within the indentations 108. FIG. 2 is an expanded view of one of the indentations 108 illustrating a small sliver of material 200 that remains from an uncut area after punching the label from the overall material sheet. The indentation 108 is large enough to ensure that sliver 200 does not extend beyond the outer edge 106 of the write protect ring.

If all the backing material is removed from the write-protect area 104, some of the adhesive may flow onto the data area. Dust or other opaque particles may then adhere to adhesive that has encroached onto the data area. Therefore, preferably a ring of backing material is left intact at the outer diameter of the write protect area. In FIGS. 1 and 2, the backing layer is preferably removed from the inner diameter of the write-protect area 104 out to the diameter of dashed circle 112. The backing layer is preferably left intact between dashed circle 112 and the outer edge 106 of the write-protect ring. This outer ring of intact backing layer reduces the possibility of adhesive flowing onto the data area of the disk.

Figure 3:
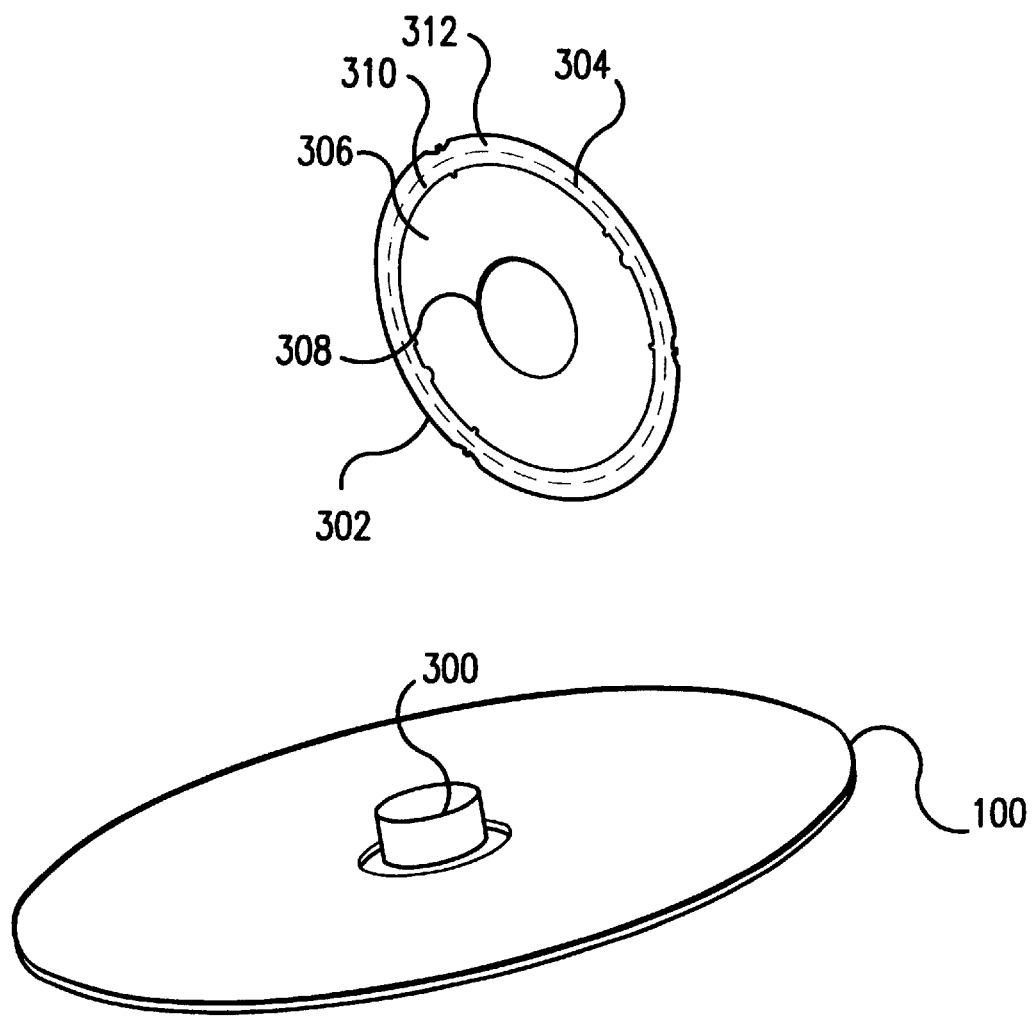
FIG. 3 is a perspective view of a disk on an alignment cylinder and a write-protect assembly in accordance with a first example embodiment of the invention.

FIG. 3 illustrates a first example embodiment of the invention. In FIG. 3, optical disk 100 is placed data side up onto an alignment cylinder 300. The alignment cylinder 300 has an outer diameter that is sufficiently less than the diameter of the central hole 102 (FIG. 1) of the disk to permit a snug fit. A write-protect assembly 302 includes a write-protect ring 304 surrounding an alignment area 306 surrounding a central area 308. The boundaries of each of the areas 304, 306, and 308 are cut through both layers of material except for small uncut areas to be torn away, as discussed above. The central area 308 has a diameter that is the same as the diameter of the central hole of the optical disk to be write protected. First, the central area 308 is manually punched out to form a hole. Next, backing material is removed over at least a portion of area 304 (the write-protect ring). The hole in the assembly 302 is then placed onto the alignment cylinder 300 with the exposed adhesive toward the data surface of the disk 100. The exposed adhesive in the write-protect ring area 304 is then firmly pressed onto the disk to ensure adhesion. Then, the disk 100 along with the attached assembly 302 is removed from the alignment cylinder 300 and the alignment area 306 is removed. Note that the temporary use of the alignment area 306 ensures that the center of the write-protect ring 304 is accurately aligned to the center of the central hole of the disk. As discussed in conjunction with FIGS. 1 and 2, preferably a small ring 312 of backing material 312 is left intact and the backing material is removed only from ring 310 to prevent adhesive from flowing onto the data area of the disk. Preferably indentations are provided for tear areas as depicted by indentations 108 in FIGS. 1 and 2. Finally, tabs with intact backing material may be provided to facilitate removal, as depicted by tabs 110 in FIG. 1.

One potential concern with the first embodiment is that as the write-protect ring area 304 is manually pressed against the data side of the disk, oil from the skin, hand lotion, or other contaminants may be spread onto the data area of the disk. Typically the drive laser is sufficient to overcome minor contamination but as bit density increases with DVD cleanliness of the data surface may become important. One solution is to provide a soft pad for pressing the write-protect area. Another solution is to provide additional temporary material outside the write-protect ring 304. For example, a relatively wide protection ring of material may be provided so that the write-protect ring 304 is between the alignment area 306 and the outer protection ring. The outer ring would protect the data area as the write-protect ring area 304 is pressed onto the disk, and then the alignment area 306 and the outer protection ring would be removed from the disk. Another alternative solution is to place the write-protect assembly onto the alignment cylinder first, with the exposed adhesive up, and then place the disk onto the alignment cylinder with the data side down, pressing the disk against the write-protect assembly. With each of these alternatives, there is reduced finger contact on the data area of the disk.

Figure 4:
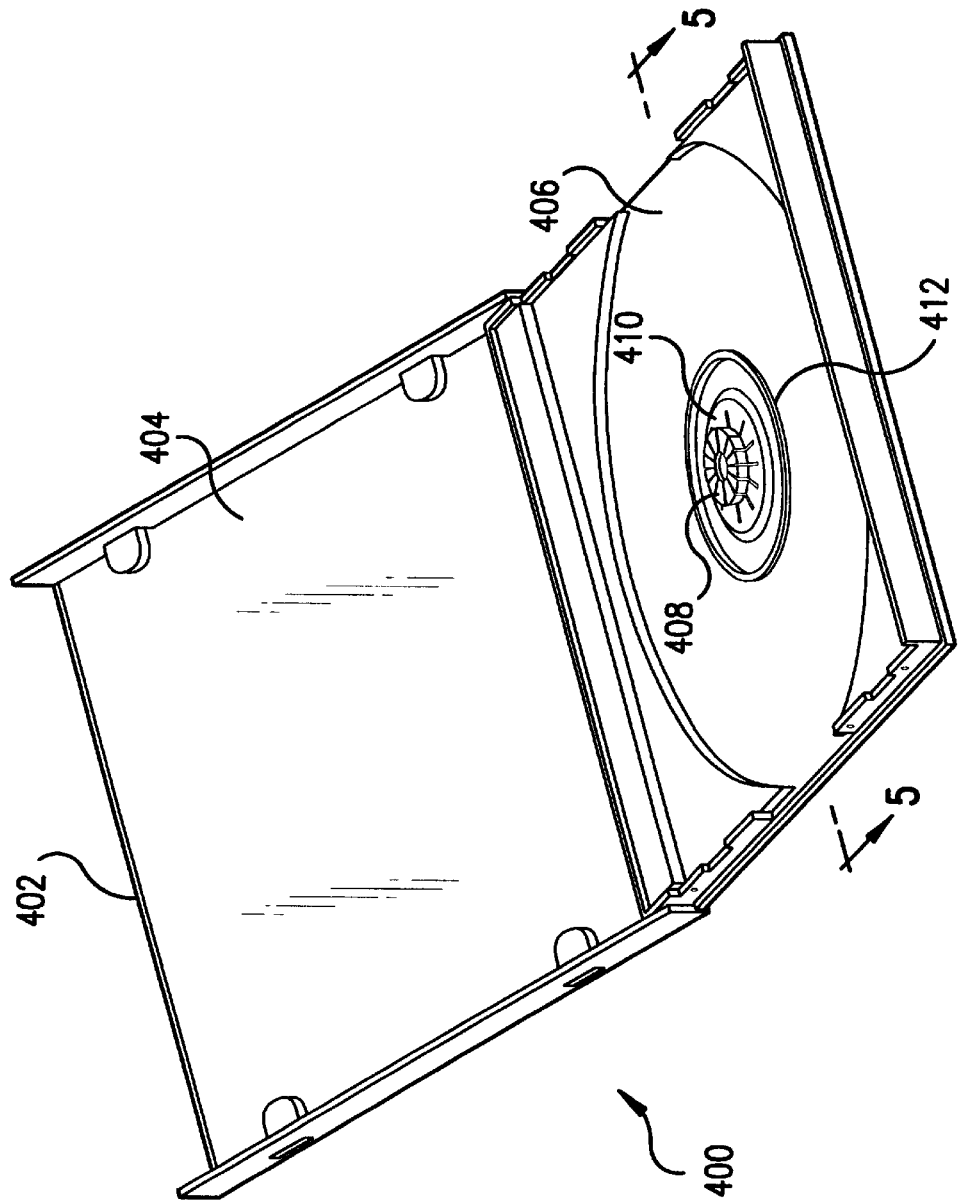
FIG. 4 is a perspective view of an opened jewel case for holding optical disks, with a modification in accordance with the invention.

FIG. 4 illustrates a opened jewel case 400, commonly used to store CD's. The jewel case includes a lid 402. The jewel case 400 includes a molded plastic insert tray 406. Insert tray 406 includes a flexible hub 408 (sometimes called a "rosette") used to grip the center hole of a disk (FIG. 1, 102). A disk is manually pressed onto the hub 408 until the disk is in contact against a shoulder 410. Typically, the shoulder 410 prevents the data surface of the disk from contacting the insert tray 406. If the disk is placed onto the hub 408 first, the hub 408 for a conventional jewel case may be used as an alignment cylinder as discussed above in conjunction with FIG. 3.

Figure 5:
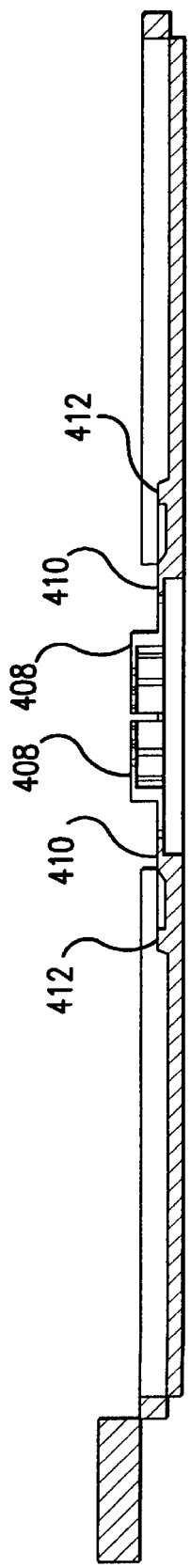
FIG. 5 is a cross section of the insert tray for a jewel case as in FIG. 4.

In a second example embodiment of the invention, the jewel case insert tray 406 is modified by providing an additional ring-shaped raised surface 412. FIG. 5 depicts a cross-section through the jewel case insert tray of FIG. 4. In FIG. 5, the height of the ring shaped surface 412 is the same height as the shoulder 410 or slightly higher. The ring-shaped surface has approximately the same inner and outer diameter dimensions as the adhesive area of the write protect ring. With the ring shaped surface 412, a modified insert tray may be used with the write-protect assembly placed onto the hub first, as discussed above in alternatives for the first example embodiment. A modified insert tray as illustrated in FIG. 5 may be provided as a separate alignment fixture to be shipped with disk media or drives, or the disk media may be shipped in jewel cases with modified insert trays.

Figure 6A:
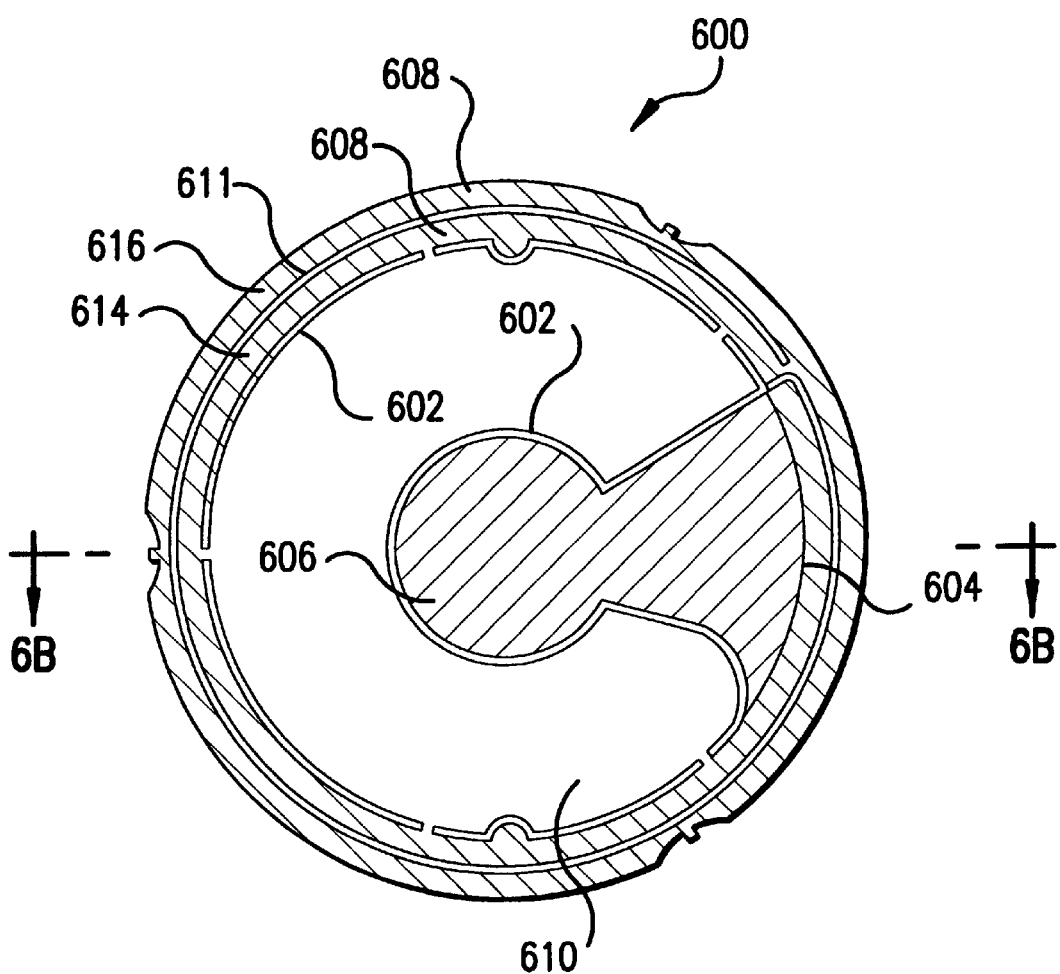
FIG. 6A is a plane view of a write-protect assembly before pressing onto the hub of a jewel case in accordance with a second example embodiment of the invention.

FIG. 6A illustrates a write-protect assembly 600 in accordance with a second example embodiment of the invention. In FIG. 6A, the write-protect assembly 600 is viewed from the backing layer side of the material. Both layers of material are cut through along the line indicated by reference number 602 except for small uncut areas that hold the pieces together before removal. Only the label layer is cut along line 604 and only the backing layer is cut along line 611. No material is removed before the assembly is pressed onto a hub. The assembly 600 is manually pressed, label side down, onto the hub (FIG. 4, 408) of a jewel case insert tray, modified as illustrated in FIGS. 4 and 5. As a result, both layers of material for the area indicated by reference number 606 are lifted out of the assembly 600 by the hub 408.

Figure 6B:
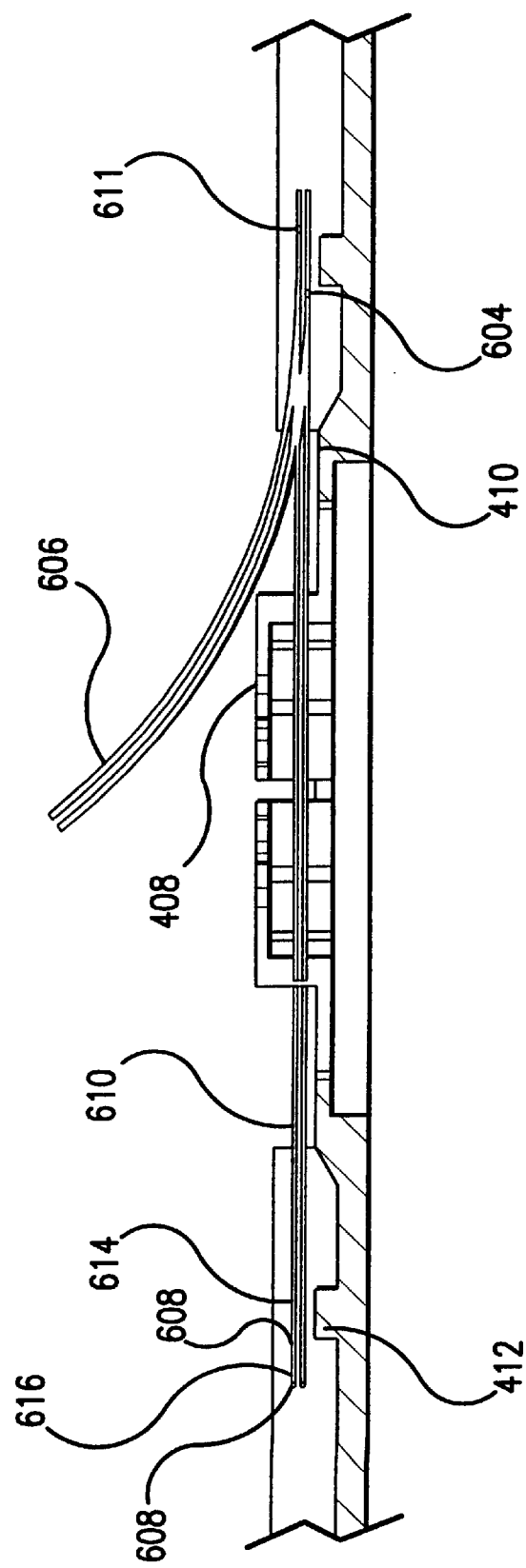
FIG. 6B is a cross section of the write-protect assembly of FIG. 6A after pressing onto the hub of a jewel case.

FIG. 6B depicts a cross-section of the assembly 600 after pressing onto the hub 408. Note that both layers in area 606 are lifted away whereas both layers of area 610 are pressed against the shoulder 410. Area 606 then provides a convenient tab to manually grip for further removal of material. Area 606 of the assembly 600 is then manually pulled away.

Figure 6C:
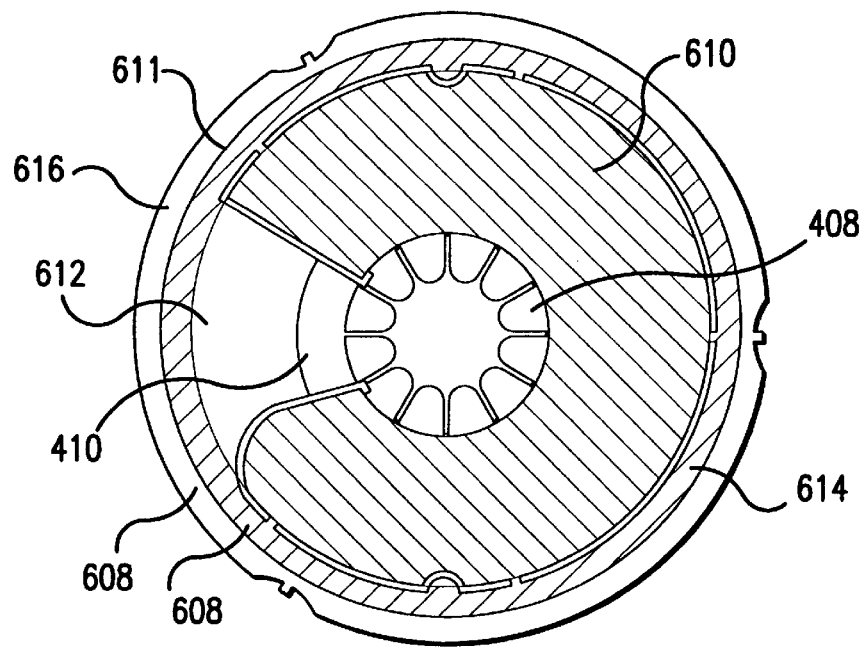
FIG. 6C is a plane view of the write-protect assembly of FIG. 6A after part of the layers have been removed.

Since only the label layer is cut along lines 604 and only the backing layer is cut along line 611 (FIGS. 6A and 6B), the backing material, in the area indicated in FIGS. 6A–6C by reference number 614, is also removed, but not the label material below area 608. The result is illustrated in FIG. 6C. In FIG. 6C, the area indicated by reference number 612 is open with both layers removed. The area indicated by reference number 614 is exposed adhesive on the back of the label layer. The areas indicated by reference numbers 610 and 616 have both layers intact.

Next, with the write-protect assembly in place as depicted in FIG. 6C, the disk to be write protected is pressed, data side down, onto the hub 408 of the insert of the jewel case. The material indicated by area 610 in FIG. 6C acts as an alignment area, centering the write-protect ring (FIG. 6C, 608) as it is being attached to the disk. The assembly 600 is then squeezed between the disk and the insert tray such that the exposed adhesive indicated by area 614 in FIG. 6C is pressed against the disk by the raised ring-shaped surface 412 on the insert tray.

The disk is then removed from the jewel case, with the assembly 600 now attached to the disk. Both layers of material indicated by area 610 in FIG. 6C are then manually removed. The final result is as depicted in FIG. 1, with just the write-protect ring portion of the label layer (FIG. 1, 104, FIG. 6C, 608) attached to the disk with accurate centering.

Figure 7:
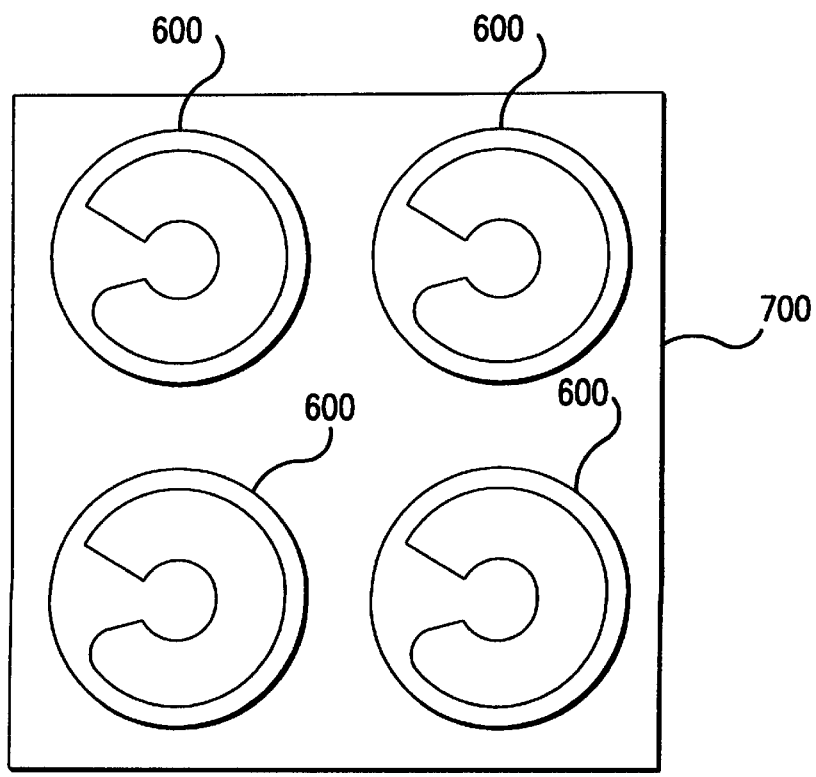
FIG. 7 is a plane view of four write-protect assemblies formed onto a sheet of material suitable for inserting into the lid of a jewel case for optical disks.

FIG. 7 illustrates a larger sheet 700 of the two-layer material with four write-protect assemblies 600 cut into the layers of the sheet. Each assembly 600 is used to form one write-protect ring. The sheet illustrated in FIG. 7 has an overall size suitable for inserting into the lid 402 (FIG. 4) of a CD jewel case, in the general area indicated by reference number 404 in FIG. 4, just as title inserts and other materials are commonly placed in the lid.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of attaching a write-protect ring to a disk, the disk having a central hole, the method comprising the following steps:

placing the central hole of the disk onto an alignment cylinder;

exposing adhesive on at least part of the write-protect ring;

placing an alignment ring with the write-protect ring attached to the alignment ring onto the alignment cylinder, the alignment cylinder aligning the alignment ring and the write-protect ring with the disk;

pressing the exposed adhesive of the write-protect ring against the disk, thereby attaching the write-protect ring and the alignment ring to the disk; and removing the alignment ring from the disk, whereby writing to the disk is prevented.

2. The method of claim 1 wherein the alignment cylinder comprises a hub in a storage case for optical disks.

3. The method of claim 1 wherein the write-protect ring is opaque.

4. The method of claim 1 wherein the disk comprises a power calibration area, and the write-protect ring substantially covers the power calibration area.

5. The method of claim 1 further comprising:
removing the write-protect ring from the disk, whereby writing to the disk is permitted.

6. The method of claim 1 wherein the write-protect ring is permanently attached.

7. The method of claim 1 wherein the step of placing the central hole of the disk onto the alignment cylinder is performed before the step of placing the alignment ring onto the alignment cylinder.

8. A method of attaching a write-protect ring to a disk, the disk having a central hole, the method comprising the following steps:
placing an alignment ring, with the write-protect ring attached to the alignment ring, onto an alignment cylinder;
exposing adhesive on at least a portion of the write-protect ring;
placing the central hole of the disk onto the alignment cylinder, the alignment cylinder aligning the alignment ring and the write protect ring with the disk;
pressing the disk against the exposed adhesive of the write-protect ring, thereby attaching the write-protect ring and the alignment ring to the disk; and
removing the alignment ring from the disk whereby writing to the disk is prevented.

9. The method of claim 8 further comprising the step of providing a surface so that when the disk is pressed against the exposed adhesive on the write-protect ring the write-protect ring is pressed against the surface.

10. The method of claim 8 wherein the alignment cylinder comprises a hub in a storage case for optical disks.

11. The method of claim 8 wherein the write-protect ring is opaque.

12. The method of claim 8 wherein the disk comprises a power calibration area and the write-protect ring substantially covers the power calibration area.

13. The method of claim 8 further comprising:
removing the write-protect ring from the disk, whereby writing to the disk is permitted.

14. The method of claim 8 wherein the write-protect ring is permanently attached.

15. The method of claim 8 wherein the step of placing the alignment ring onto the alignment cylinder is performed before the step of placing the central hole of the disk onto the alignment cylinder.

16. A write-protect assembly comprising:
a first layer having a adhesive backing;
a second layer covering the adhesive backing of the first layer;
an inner area that is circular, the inner area having a diameter that is the same as the diameter of a central hole of an optical disk;
an alignment area at least partially surrounding the inner area;
a write-protect ring surrounding the alignment area; and
the first and second layers at least partially cut through sufficient to permit manual separation of the inner area from at least part of the alignment area and separation of the alignment area from the write-protect ring.

17. The write-protect assembly of claim 16 wherein the inner area, part of the alignment area, and the write-protect ring are all connected within the second layer.

18. The write-protect assembly of claim 16 wherein the write-protect assembly is one of a plurality of write-protect assemblies contained within a larger sheet, the larger sheet having dimensions suitable for inserting into a lid of a storage case for the optical disk.

19. The write-protect assembly of claim 16 wherein an outside edge of the write-protect ring comprises one or more indentations.

20. The write-protect assembly of claim 16 wherein an inside edge of the write-protect ring comprises one or more tabs on which the second layer remains upon said manual separation.

* * * * *